United States Patent [19]

Kim et al.

[11] Patent Number: 5,676,779
[45] Date of Patent: Oct. 14, 1997

[54] DEVICE FOR THE SURFACE TREATMENT OF ALIGNMENT FILM BY WET-TYPE FRICTION METHOD

[75] Inventors: Eung-jin Kim; O-Okk Park, both of Taejeon-si; Kyu-jong Lee, Kyonggi-do, all of Rep. of Korea

[73] Assignee: Samsung Display Devices Co., Ltd., Kyonggi-do, Rep. of Korea

[21] Appl. No.: 592,211

[22] Filed: Jan. 24, 1996

[51] Int. Cl.$^6$ .................................................... G02F 1/13
[52] U.S. Cl. ................ 156/73.5; 156/153; 156/580; 349/126; 428/1
[58] Field of Search .......................... 156/73.5, 153, 156/154, 580; 349/126; 428/1

[56] References Cited

U.S. PATENT DOCUMENTS

| | | | |
|---|---|---|---|
| 5,075,790 | 12/1991 | Hayashi et al. | 349/126 |
| 5,151,298 | 9/1992 | Nammatsu et al. | 427/77 |
| 5,221,981 | 6/1993 | Kodera et al. | 349/126 |
| 5,390,037 | 2/1995 | Negishi | 349/126 |
| 5,422,750 | 6/1995 | Kodera et al. | 349/126 |
| 5,455,695 | 10/1995 | Kodera et al. | 349/126 |

*Primary Examiner*—James Sells
*Attorney, Agent, or Firm*—Christie, Parker & Hale, LLP

[57] ABSTRACT

A device for surface treating an alignment film used for forming a liquid crystal display comprising a glass substrate, an alignment film formed on a surface of the glass substrate, and a suspension in which the above alignment film is immersed, the suspension ball-type particles. In a first embodiment, a roller is adhered closely to the alignment film by the ball-type particles and is rotated in one direction by power applied from outside to form a plurality of gullies on the surface of the above alignment film. In other embodiments, a circular rotational body or a conical rotational body is adhered closely to the alignment film to provide a fixed shear rate between the suspension and the alignment film by rotational movement in one direction to form a plurality of circular gullies on the surface of the alignment film by the ball-type particles.

11 Claims, 2 Drawing Sheets

DEVICE FOR THE SURFACE TREATMENT OF ALIGNMENT FILM BY WET-TYPE FRICTION METHOD

BACKGROUND OF THE INVENTION (1) Field of Invention

The present invention relates in general to a device for surface treating an alignment film by wet-type friction method and, more particularly, to a device for surface treating an alignment film by wet-type friction method comprising performing a rubbing movement to align liquid crystal molecules by rotating a suspension including ball-type particles on a surface of the alignment film.

(2) Description of Related Art

With the recent spread of small sized portable televisions, different types of plane display units have been developed and have spread rapidly to replace the cathode-ray tube that has been used to date as the expression device for office automated machines.

The liquid crystal display, among such different plane display units, has various uses that includes a display unit for portable computers, car and color televisions, and the like, by virtue of its merits. Such merits include, for example, light weight, low price and low electric power consumption.

The liquid crystal display is formed from two boards having an electrically conductive nature that are arranged parallel with one another. Liquid crystal molecules are infused into a space between the two boards. The liquid crystal display so formed displays letters, numerals and any design by electro-optical effect.

The liquid crystal display has a structure in which clusteric or nematic liquid crystal is infused into a liquid crystal cell. The liquid crystal cell is formed by piling sealants up in a circle around an upper and a lower glass substrate, of which transparent electrode and alignment film are laminated. The liquid crystal cell provides a picture display by an alignment nature when a material having dielectric bidirectivity is placed on an electric field.

When an electrode is applied to the transparent electrode formed on the upper and lower glass substrate, and an electric field is formed at the place between the electrode and the transparent electrode, a liquid crystal accommodated in the inner part twists or changes its molecule axis direction by the dielectric bidirectivity. As a result, the part of the twisted liquid crystal refracts the light of the outside to a different color from the other part of the liquid crystal that is not twisted so that a picture display is possible.

Accordingly, for a liquid crystal display to display necessary information by using the twist phenomenon it is necessary that the molecule arrangement of the liquid crystals be exact.

Finally, an alignment film is formed after spreading polyvinyl alcohol (PVA), organic silane film or polyamide resin, in a fixed thickness, on a substrate in which an electrode layer is formed. At this time, if the alignment film is rubbed in the same direction by a fiber material such as a piece of dry cloth, it forms very minute gullies on the surface of the alignment film.

Though a rubbing movement to form gullies, which is possible to uniformly align liquid crystal molecules on an alignment film as described above, is very simple, because it has an effect on the uniformity of liquid crystal display, it is necessary that a uniform pressure be used along the entire alignment film. Accordingly, the arrangement of liquid crystal molecules should be aligned uniformly on the alignment film in order to produce a correct information display.

When forming an alignment film and performing a rubbing movement for the purpose as described above in conventional art, as illustrated in FIGS. 1A and 1B, the alignment film 1 formed on the substrate surface is moved in the appointed direction and is passed through a roller 3. The roller 3 is enclosed by a dry cloth in which feathers 20 are formed. Accordingly, when an alignment film 1 is passed through a roller 3, gullies which can align liquid crystal molecules, are formed by the fixed pressure applied from the roller 3 onto the alignment film.

However, the use of such conventional method to surface treat the alignment film causes the alignment film to be stained by dust that is generated when moving the alignment film 1 after pressing the alignment film 1 by using a dry cloth as described above. Additionally, liquid crystal molecules are not aligned uniformly using such conventional method due to static electricity generated sectionally as a result of rubbing the alignment film 1 after pressing the alignment film by a dust cloth. Further, liquid crystal molecules are not aligned uniformly using such conventional surface treatment method because of pressure differences that are applied to the alignment film by the roller 3 due to differently sized liquid crystal display.

SUMMARY OF THE INVENTION

An object of the present invention is to provide a device for treating the surface of an alignment film by using wet-type friction methods in order to perform an alignment movement of liquid crystal molecules by using gullies formed between ball-type or ball shaped particles and the alignment film as a consequence of performing a rubbing movement against the alignment film in suspension including the ball-type particles.

The features of a preferred embodiment of the present invention, to achieve the above purpose, include a glass substrate, an alignment film formed on a surface of the glass substrate, a suspension in which the alignment film is immersed and comprising ball-type particles, and a roller in contact with the alignment film by the ball-type particles. The roller is rotated in one direction by power applied from an outside source to form gullies on the surface of the alignment film.

The features of another preferred embodiment of the present invention, to achieve the above purpose, include a glass substrate, an alignment film formed on a surface of the glass substrate, a suspension in which the above alignment film is immersed and the above ball-type particles are included, and a circular rotational body for forming a fixed shear rate between the suspension and the alignment film by rotating the circular rotational body in one direction. The circular rotational body is rotated by power supplied from an outside source to form circular gullies on the surface of alignment film by the ball-type particles included in the suspension.

The features of still another preferred embodiment of the present invention, to achieve the above purpose, include a glass substrate, an alignment film formed on a surface of the glass substrate, a suspension in which the above alignment film is immersed and the above ball-type particles are included, and a conical rotational body for forming a fixed shear rate between the suspension and the alignment film by rotating the conical rotational body in one direction. The conical rotational body is rotated by power supplied from an outside source to form circular gullies on the surface of the alignment film by the ball-type particles included in the suspension.

DETAILED DESCRIPTION OF THE PREFERRED EMBODIMENT

Figure 1A:
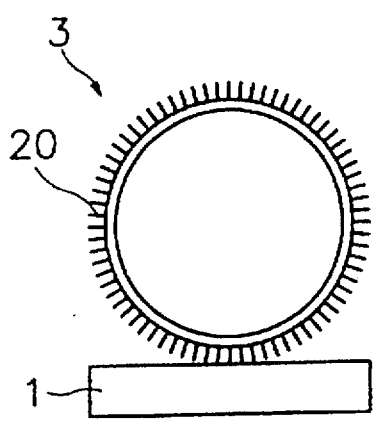
FIGS. 1A and 1B illustrate a conventional device for treating the surface of an alignment film by using a dry-type friction method.
Figure 1B:
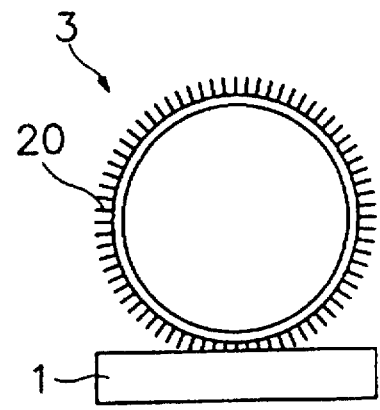

Reference will now be made in detail to preferred embodiments of the invention, examples of which are illustrated in the accompanying figures. It is to be understood that the same reference characters are used throughout the figures to refer to the same or like parts.

Figure 2:
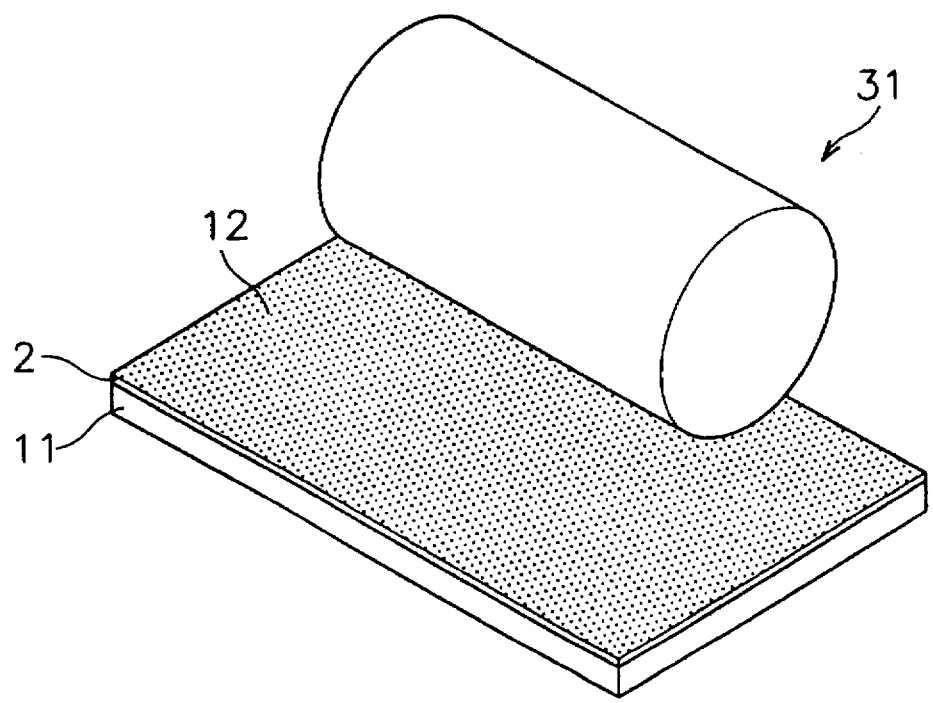
FIG. 2 illustrates a device for treating the surface of an alignment film by wet-type friction method according to a preferred embodiment of the present invention.
Figure 3:
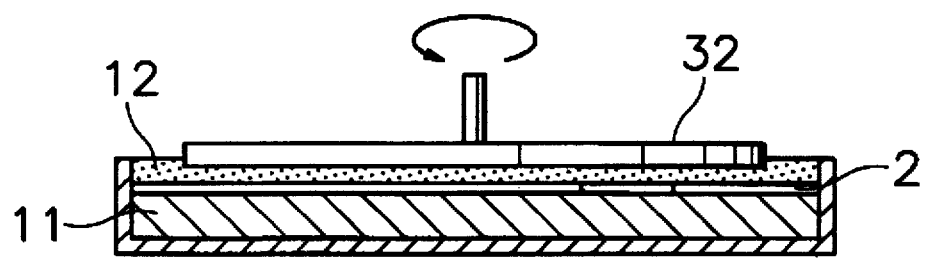
FIG. 3 is a sectional view illustrating a device for treating the surface of an alignment film by wet-type friction method according to another preferred embodiment of the present invention.
Figure 4:
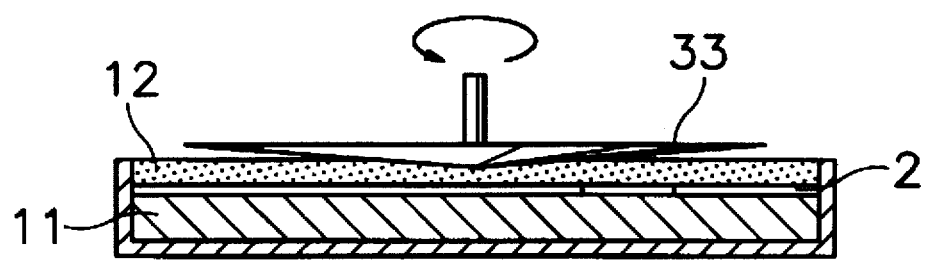
FIG. 4 is a sectional view illustrating a device for treating the surface of an alignment film by using wet-type friction method according still another preferred embodiment of the present invention.

FIG. 2 illustrates a device for treating the surface of an alignment film by using wet-type friction method according to a preferred embodiment of the present invention; FIG. 3 is a sectional view illustrating a device for treating the surface of an alignment film by using wet-type friction method according to another preferred embodiment of the present invention; and FIG. 4 is a sectional view illustrating a device for treating the surface of an alignment film by using wet-type friction method according to still another preferred embodiment of the present invention.

As illustrated in FIG. 2, a preferred embodiment of the present invention, to achieve the above purpose, includes a glass substrate 11, an alignment film 2 formed on a surface of the glass substrate 11, a suspension 12 comprising ball-type or ball shaped particles in which the alignment film 2 is immersed, and a roller 31 adapted to rotate according to the movement of the alignment film 2.

The preferred embodiment of the present invention performs a wet-type friction rubbing movement against the alignment film in water instead of by a dry cloth, and forms necessary gullies in the alignment film 2 by using ball-type particles included in the water. After forming the alignment film on the surface of the glass substrate 11, a preferred embodiment of the present invention puts the alignment film 11 into a suspension 12 that includes minute ball-type particles in order to uniformly align the liquid crystal molecules.

The ball-type particles may comprise aluminum, glass or polymer, etc., and form gullies of an appointed depth by pressure applied from an outside source. If the alignment film 2 is passed through the roller 31, after the alignment film has been put into the suspension including the ball-type particles as described above, in the appointed direction, the ball-type particles are adhered closely on the alignment film 2 by the roller 31. If the distance between the alignment film and the roller 31 is fixed, and if the alignment film 2 is pulled through the roller 31 at a set speed, the distribution proportions of the fluid speed of the suspension 12 will also be fixed.

Accordingly, because the fluid flow of the suspension 12 is proceeded by the rotational movement of the roller 31, the shear rate acting on the alignment film 2 by the fluid flow of the suspension should be maintained in a uniform state.

At this time, if the viscosity of the fluid is not variable by the rotational movement of the roller 31, the shear rate acting between the ball-type particles in the suspension 12 and the alignment film is variable according to the rotational speed of the roller 31.

The amount of friction between the ball-type particles in the suspension 12 and the alignment film 2 is controlled by the shear rate acting between the suspension 12 and the alignment film only according to the rotational speed of the roller 31. Accordingly, it is possible to adjust the shear rate by adjusting the rotational movement of the roller 31, so that the density of the gullies formed on the alignment film may be adjusted and controlled.

As illustrated in FIG. 3, another preferred embodiment of the present invention, to achieve the above purpose, includes a glass substrate 11, an alignment film 2 formed on a surface of the glass substrate 11, a suspension 12 in which the alignment film is immersed and ball-type particles are included, and a circular rotational body 32 applied to rotate the suspension 12 by power applied from an outside source.

In such embodiment, the suspension 12 and ball-type particles are rotated in a circular movement by rotating the circular rotational body 32 in one direction. In such embodiment, the magnitude of shear rate between the suspension and ball-type particles and the alignment film, for a given distance between the alignment film and circular rotational body, is variable according to the rotational degree of the suspension 12.

At this time, as described above, a plurality of small gullies are formed on the surface of the alignment film 2 by the rotation of the ball-type particles included in suspension 12 according to the rotational speed of the circular rotational body 32. The depth of such gullies formed are adjusted according to the rotational speed of the circular rotation body 32 because the degree which the ball type particles scratch the surface of an alignment film 2 is variable according to a rotary power source used to rotate the circular rotational body.

During rotation of the circular rotational body 32, a number of concentric circles are formed as gullies on the surface of the alignment film 2 due to the rotational movement of the circular rotational body 32, so that the arrangement of the liquid crystal molecules is realized along the formed gullies.

The method of using the circular rotational body 32 to form the gullies of the alignment film 2 prevents the loss of the suspension 12 by the rotational movement of the circular rotational body 32, and also reduces the sedimentation phenomenon associated with using ball-type particles, so that it is possible to form, more effectively, gullies for aligning liquid crystal molecules.

As illustrated in FIG. 4, still another preferred embodiment of the present invention, to achieve the above purpose, includes a glass substrate 11, an alignment film 2 formed on a surface of the glass substrate 11, a suspension 12 formed on the alignment film 2 and comprising ball-type particles, and a conical rotational body 33 for rotating the suspension 12 by power applied from an outside source.

In such preferred embodiment of the present invention, because a conical rotational body rotates in one direction by power applied from outside, the suspension 12 also rotates in the same direction by contact with the conic rotational body 33. Additionally, because the shape of the rotational body is the same as the shape of the suspension when it is rotated thereby, the shear rate transmitted to the suspension by the rotational movement of the conical rotational body 33 is all at the same state.

Accordingly, in such preferred embodiment, the same magnitude of shear rate is applied to the surface of the alignment film independent of the radius of the conical rotational body 33. Accordingly, the formation of gullies, to align the liquid crystal molecules, may be realized uniformly without any connection with the shape of a conic rotation body 33 by transmitting a fixed friction to the surface of the alignment film 2. The definition of a liquid crystal display formed therefrom is improved by forming gullies more closely on the surface of the alignment film.

The present invention as described above rubs the surface of the alignment film in suspension including ball-type particles in order to align uniformly liquid crystal molecules. Using such wet-type friction method reduces the generation of static electricity or dust. Accordingly, such method effects the uniform alignment movement of liquid crystal molecules, so that it cures a problem that the definition of liquid crystal display is debased by static electricity or dust generated in gullies when formed from a dry-type friction rubbing movement.

The magnitude of shear rate applied to the surface of the alignment film is adjusted by the rotational speed of the rotational body, so that the density of gullies formed on the surface of the alignment film may be varied. The rotational body performs the rubbing on the alignment film by using an external rotary power source, so that it performs the alignment operation independent of the size of the liquid crystal display.

What is claimed is:

1. A method for surface treating an alignment film used for forming a liquid crystal display, the method comprising the steps of:

forming an alignment film on a surface of a glass substrate;

immersing the alignment film in a suspension comprising a plurality of ball shaped particles; and forming a plurality of gullies in the alignment film by moving the ball shaped particles.

2. A device for surface treating an alignment film:

a glass substrate;

an alignment film formed on a surface of the glass substrate;

a suspension in which the alignment film is immersed, the suspension comprising ball shaped particles; and a roller disposed on a surface of the alignment film to form gullies on the surface of the alignment film by rotation of the roller.

3. The device as recited in claim 2, wherein the ball shaped particles are selected from the group of materials consisting of aluminum, glass, and polymeric materials.

4. A device for surface treating an alignment film:

a glass substrate;

an alignment film formed on a surface of the glass substrate;

a suspension in which the alignment film is immersed, the suspension comprising ball shaped particles; and a circular rotational body disposed on a surface of the alignment film, the circular rotational body being adapted to provide a fixed shear rate between the suspension and the alignment film during rotation movement of the circular rotational body to form circular gullies on the surface of the alignment film by the ball shaped particles.

5. The device as recited in claim 4, wherein the ball shaped particles are selected from the group of materials consisting of aluminum, glass, and polymeric material.

6. A device for surface treating an alignment film:

a glass substrate;

an alignment film formed on a surface of the glass substrate;

a suspension in which the alignment film is immersed, the suspension comprising a plurality of ball shaped particles; and a conical rotational body disposed closely to a surface of the alignment film, the conical rotational body being adapted to provide a fixed shear rate between the suspension and the alignment film during rotation movement of the conical rotational body to form circular gullies on the surface of the alignment film by the ball shaped particles.

7. The device as recited in claim 6, wherein the ball shaped particles are selected from the group of materials consisting of aluminum, glass, and polymeric materials.

8. A device for surface treating an alignment film used for forming a liquid crystal display, the device comprising:

a glass substrate;

an alignment film disposed on a surface of the glass substrate, wherein the alignment film is immersed in a suspension comprising a plurality of ball shaped particles; and means for forming gullies in the alignment film by rotating the ball shaped particles.

9. The device as recited in claim 8 wherein the means for forming gullies is a roller that is disposed on a surface of the alignment film and is in contact with the ball shaped particles.

10. The device as recited in claim 8 wherein the means for forming gullies is a circular rotational body disposed on a surface of the alignment film, wherein the circular rotational body has a surface that is in contact with the ball shaped particles.

11. The device as recited in claim 8 wherein the means for forming gullies is a conical rotational body disposed on a surface of the alignment film, wherein the conical rotational body has a surface that is in contact with the ball shaped particles.

* * * * *

UNITED STATES PATENT AND TRADEMARK OFFICE
CERTIFICATE OF CORRECTION

PATENT NO.　：　5,676,779
DATED　　　：　October 14, 1997
INVENTOR(S)：　Eung-jin Kim; O-Okk Park; Kyu-jong Lee It is certified that error appears in the above-indentified patent and that said Letters Patent is hereby corrected as shown below:

Column 1, line 60, change "Though" to -- Through --; and replace "which" with -- it --.
Column 3, line 15, after "according" insert -- to --.
Column 4, line 62, change "conic" to -- conical --.
Column 5, line 6, change "conic" to -- conical --.

Signed and Sealed this

Twenty-fifth Day of August, 1998

Attest:

BRUCE LEHMAN

*Attesting Officer*　　　　*Commissioner of Patents and Trademarks*